3,775,384
POLYMER AND METHOD OF MAKING

Walter P. Barie, Jr., Shaler Township, Pa., assignor to Gulf Research & Development Company, Pittsburgh, Pa.
No Drawing. Filed Dec. 26, 1972, Ser. No. 318,267
Int. Cl. C08f 27/18
U.S. Cl. 260—78.4 D          6 Claims

ABSTRACT OF THE DISCLOSURE

A solid, infusible polymer is made by cross-linking the liquid resin condensation product of maleic anhydride, phthalic anhydride and propylene glycol or ethylene glycol in a 1:1:2 molar ratio with 40 to 50 weight percent based on the liquid resin of tetraallyl benzophenonetetracarboxylate. The resulting polymer exhibits a very high heat distortion temperature and a fiber glass laminate of the polymer exhibits a very high flexural strength.

---

This invention relates to the preparation of solid, infusible polymers of improved physical properties. The heat distortion temperature test (ASTM D–648) provides an indicator of the stability of cast polymers, including encapsulating polymers, under stress. The flexural strength test (ASTM D–790) provides an indicator of the stability of a polymer reinforced laminate under stress.

I have discovered a novel, fully cured, hard, infusible polymer of exceptionally high heat distortion temperature and flexural strength and a method of preparing it using a novel and critical formulation of reactants.

The fully cured polymer of this invention is made by the reaction of the liquid resin obtained from the condensation of maleic anhydride, phthalic and a glycol reactant selected from propylene glycol, ethylene glycol or mixtures thereof in a molar ratio of about 1:1:2, respectively, with about 40 to about 50, preferably about 45, weight percent based on the liquid resin or tetraallyl benzophenonetetracarboxylate. Liquid resins of the required formulation are commercially available.

It is necessary to use a suitable free radical initiator to promote the reaction of this resin mixture. Suitable free radical initiators include diacyl peroxides such as benzoyl peroxide, lauroyl peroxide, p-chlorobenzoyl peroxide, etc.; a hydroperoxide such as t-butyl hydroperoxide, cumene hydroperoxide, 2,5 - dimethylhexyl-2,5-dihydroperoxide, etc.; a peroxyester such as t-butyl perbenzoate, t-butyl peracetate, t-butyl peroxyisobutyrate, di-t-butyldiperphthalate, etc.; an alkyl peroxide such as di-t-butyl peroxide, dicumyl peroxide, 2,5-dimethyl-2,5-di(t-butylperoxy)hexane, etc. The preferred free radical initiator is t-butyl perbenzoate. Only a minor amount of the free radical initiator is required. By minor amount I broadly mean about 0.1 to about five weight percent, preferably about 0.5 to about two weight percent, of the free radical initiator based on the total of the liquid resin and cross-linking agent.

The resin mixture is cured at a temperature between about 100° C. and about 225° C. and preferably between about 135° C. and about 175° C. for a sufficient period of time to effect the cure. The cure can be effected in one-step at a single temperature or in several steps at different temperatures. When the resin mixture in a laminate is cured, it is necessary to use pressure during the cure cycle until the resin solidifies. A pressure between about 25 and about 1,000 p.s.i. or higher can be used, preferably a pressure between about 25 and 500 p.s.i. In curing a laminate it is convenient to cure the resin mixture under pressure until it solidifies and then post-cure it within the specified temperature range without the application of external pressure. A post-cure can be beneficial by insuring complete cure and a resulting optimization of properties. The post-cure is preferably carried out at a temperature between about 175° C. and 225° C.

Although a curing program in finite steps is indicated in the suggested combination of a curing cycle and a post-curing cycle as well as an optional pre-curing cycle, it is also feasible and convenient to use a curing program which involves either a series of relatively small incremental temperature increases or a continuous, gradual temperature increase within the desired temperature range, provided that the net effect is essentially the same, that is, a substantially fully cured product.

In preparing a casting the liquid resin and the tetraallyl benzophenonetetracarboxylate together with a suitable free radical initiator can be cured into a clear casting at suitable conditions of temperature within the ranges specified. Alternatively, modified castings can be made by the incorporation of fillers into the resin mixture prior to curing. These fillers have the function of modifying the properties of the casting including the hardness, strength, temperature resistance, minimize crazing, etc., and can also effectively reduce the cost of the resulting casting. Suitable filler materials include aluminum powder, powdered calcium carbonate, silica, kaolinite (clay), magnesium silicate and the like.

As indicated, the liquid resin-tetraallyl benzophenone-tetracarboxylate mixture can also be effectively used in producing reinforced laminates. These laminates are made from a fibrous mat or by laying together a multiplicity of sheets of material to form a matrix and consolidating the matrix into a unitary structure by flowing the resin mixture through the fibrous material and curing it while in a mold or hydraulic press to form the polymer. The core or matrix is most commonly fibrous in nature and can be of a regular orientation such as occurs in a woven material or can be random in pattern such as in floc and paper. The fiber forming the core or matrix can be either a natural fiber or a synthetic fiber such as cellulose derived from wood, cotton, linen, sisal hemp, and the like, asbestos, glass, nylon, polyester, cellulose acetate, and the like.

Woven glass fabrics are well known for forming resin bonded laminates and are readily commercially available. The fabrics are made from various yarn sizes and come in different weaves in various thicknesses. It is particularly desirable in preparing glass laminates hereunder that the glass fabric be coated or finished with a material which will substantially increase the bond strength of the resin-glass bond. Particularly preferred are finishes which react with the resin during the cure such as the amino silanes, epoxy-modified methoxy silanes, vinyl silane and methacrylato-chromium chloride complex and which are chemically bonded to the glass. This type of bonding, at this critical region of the composite, produces high mechanical strength and good retention of properties.

The laminates can be prepared by any suitable procedure. The sheets or mat of core material are impregnated or coated by any suitable means such as by brushing or dipping. The impregnated core material, in layers if sheets are stacked together or as a single layer if a mat is used, is consolidated and shaped, if desired, in a mold under heat and pressure. The application of mold pressures in excess of about 20 p.s.i. during the curing process is advantageous not only to obtain a product of desired shape and resin distribution but also to help control the resin content by squeezing out excess material. Under proper compression excess resin is squeezed out and the glass laminate is compressed to increase the glass to resin ratio and direct the laminate to the glass to resin ratio of maximum flexural strength.

The polymerization is thermally initiated using a free radical reaction initiator or promoter as described. The reaction rate is, in part, dependent on the availability of free radicals produced by the thermal decomposition of the free radical initiator and it is also, in part, dependent on the reactivity of the relatively stable allyl radical. Since the reaction rate of the allyl radical is very low at moderate temperatures, it is necessary to use relatively high temperature to completely cure the material. Therefore, it is desirable to use a free radical initiator with a relatively high decomposition temperature, that is, generally within the range of temperature at which the allyl radical is reactive, in order to obtain optimum properties in the resulting resin. For this reason, t-butyl perbenzoate is a very satisfactory reaction promoter.

Tetraallyl benzophenonetetracarboxylate can be prepared from benzophenonetetracarboxylic dianhydride which is commercially available. The dianhydride is refluxed with an excess of methanol to form tetramethyl benzophenonetetracarboxylate. The tetramethyl ester is then transesterified using an excess of allyl alcohol and a suitable transesterification catalyst such as tetrabutyl titanate by distilling off the methyl alcohol as it is generated. Suitable conventional purification procedures can be utilized.

The following examples are set out to illustrate the invention and to provide a better understanding of its details and advantages. In the following examples the tetraallyl benzophenonetetracarboxylate is referred to as TAB for simplification and convenience.

A liquid resin having a molar proportion of maleic anhydride, phthalic anhydride and glycol reactant of about 1:1:2, respectively, was made by the following procedure which is used to make liquid resin commercially. Maleic anhydride, phthalic anhydride, and propylene glycol in a molar proportion of 1:1:2, respectively, are charged to a reactor which is purged with an inert gas. The reactor is heated and the agitator is started after liquefaction occurs. The temperature is raised to 150° C. over a one hour period and is then held at 150°–160° C. for one hour. The temperature is increased to 215°–220° C. with reflux during a three to four hour period and 60 to 70 percent of the theoretical water of reaction is removed. After the acid number becomes about 80, the temperature is rapidly dropped to 170°–175° C. and 0.1 mol of ethylene glycol per mol of propylene glycol is added. The reaction mixture is heated to 180° C. and held there about 30 minutes and then raised to 215°–220° C. and held at this temperature until the reaction subsides. The reaction mixture is then cooled to 190° C. and four parts of xylol is added per 100 parts of the reaction mixture. Azeotropic distillation is carried out until the acid number is below 40. Hydroquinone (0.03 part per 100 parts charge) is added and about 70 percent of the xylene is distilled off. The remaining xylene is purged with a stream of nitrogen and the resulting product is the liquid 1:1:2 resin having maleic anhydride, phthalic anhydride and glycol reactant moieties in the molar proportion of about 1:1:2.

EXAMPLE 1

A casting was made from a mixture of 15 grams of the liquid 1:1:2 resin, 12.2 grams of TAB (45 weight percent based on the resin) and one weight percent based on the other constituents of t-butyl perbenzoate. This mixture was poured into a mold at room temperature. The resin mixture and mold were heated in an oven at 140° C. for one hour and then at 175° C. for one half hour. The molded polymer was cooled and removed from the mold. It was found to have a Barcol hardness (935) of 93 and a heat distortion temperature (ASTM D–648) of 145° C.

EXAMPLE 2

The procedure of Example 1 was repeated except that 10.0 grams of TAB (40 weight percent based on the resin) was used. The Barcol hardness (935) of the product polymer was 94 and the heat distortion temperature was found to be 132° C.

EXAMPLE 3

The procedure of Example 1 was repeated except that 8.0 grams of TAB (35 weight percent based on the resin) was used. The Barcol hardness (935) of the product polymer was 92 and the heat distortion temperature was 90° C.

EXAMPLE 4

A casting was made by mixing 25 grams of the liquid 1:1:2 resin, 13.5 grams of styrene (35 weight percent based on the resin) and one weight percent t-butyl perbenzoate at room temperature. The resin mixture was poured into a mold and heated at 77° C. for one hour and at 125° C. for two hours. The casting was determined to have a Barcol hardness (935) of 90 and a heat distortion temperature of 103° C.

EXAMPLE 5

The procedures of Example 4 were repeated except that 13.5 grams of diallyl phthalate (40 weight percent based on the resin) was used in the resin formulation. The Barcol hardness (935) of the resulting casting was found to be 93 and the heat distortion temperature was determined to be 120.

Formulations containing 35 weight percent styrene and 40 weight percent diallyl phthalate are reported to be the optimum formulations for these cross-linking agents in the literature. The above examples show the surprisingly superior heat distortion temperature of the resin formulations of the present invention.

EXAMPLE 6

A number of seven inch 181 glass cloth squares having a gamma aminopropyltriethoxysilane (Linde A1100) finish were twice dipped into a liquid resin treating solution in order to obtain good coverage. The treating solution contained 30 grams of the liquid 1:1:2 resin, 25 grams of TAB (45 weight percent based on the resin), one weight percent of t-butyl perbenzoate based on the reactants and 59 weight percent acetone based on the total solution. These squares were then hung up overnight to permit the acetone solvent to evaporate. A twelve ply laminate was made by stacking these squares and curing them under pressure in a heated press. The laminate was first subjected to a pressure of 50 p.s.i. for 30 seconds, then it was heated to 160° C. for 10 minutes to cure it while maintaining the 50 p.s.i. pressure on the laminate. The pressure was then removed and the laminate was post-cured at 200° C. for two hours. The cooled laminate had a flexural strength (ASTM D–790) of 97,200 p.s.i.

The literature reports flexural strengths of about 55,000 to 65,000 p.s.i. for equivalent laminates made from an equivalent 1:1:2 liquid resin cured with the optimum amount of either styrene (35 weight percent) or diallyl phthalate (40 weight percent).

It is to be understood that the above disclosure is by way of specific example and that numerous modifications and variations are available to those of ordinary skill in the art without departing from the true spirit and scope of our invention.

I claim:

1. A method of making a solid, infusible polymer which comprises reacting a liquid resin formed by the condensation of maleic anhydride, phthalic anhydride and a glycol reactant selected from propylene glycol, ethylene glycol and mixtures thereof using a molar ratio of maleic anhydride, phthalic anhydride and glycol reactant of about 1:1:2 with about 40 to about 50 weight percent based on the liquid resin of tetraallyl benzophenonetetracarboxylate in the presence of a free radical initiator at an elevated temperature.

2. A method in accordance with claim 1 in which the free radical initiator is t-butyl perbenzoate.

3. A method in accordance with claim 1 in which the temperature is between 100° C. and about 225° C.

4. A method in accordance with claim 2 in which the resin mixture is cured at a temperature between about 135° C. and about 175° C. and is post-cured at a temperature between about 175° C. and about 225° C.

5. A method in accordance with claim 1 in which about 45 weight percent of tetraallyl benzophenonetetracarboxylate is used.

6. A solid, infusible polymer comprising the reaction product of a liquid resin formed by the condensation of maleic anhydride, phthalic anhydride and a glycol reactant selected from propylene glycol, ethylene glycol and mixtures thereof using a molar ratio of maleic anhydride, phthalic anhydride and glycol reactant of about 1:1:2 with about 45 weigh percent based on the liquid resin of tetraallyl benzophenonetetracarboxylate.

No references cited.

JOSEPH L. SCHOFER, Primary Examiner

J. KIGHT III, Assistant Examiner

U.S. Cl. X.R.

156—332; 260—47 CP, UA, EA, 63 UY, 75 T, 78.4 UA

PO-1050
(5/69)

UNITED STATES PATENT OFFICE
CERTIFICATE OF CORRECTION

Patent No. 3,775,384    Dated    November 27, 1973

Inventor(s)   Walter P. Barie, Jr.

It is certified that error appears in the above-identified patent and that said Letters Patent are hereby corrected as shown below:

Col. 1, line 67, "and 500" should read --and about 500--.

Col. 4, line 73, "between 100° C." should read --between about 100° C.--.

Signed and sealed this 23rd day of April 1974.

(SEAL)
Attest:

EDWARD M.FLETCHER,JR.
Attesting Officer

C. MARSHALL DANN
Commissioner of Patents.